United States Patent [19]

Grob

[11] Patent Number: 4,722,232

[45] Date of Patent: Feb. 2, 1988

[54] MASS FLOW METER

[75] Inventor: Gustav R. Grob, Rehetobel, Switzerland

[73] Assignee: ELCO Oel-und Gasbrennerwerk AG, Switzerland

[21] Appl. No.: 826,084

[22] Filed: Feb. 4, 1986

[30] Foreign Application Priority Data

Feb. 5, 1985 [GB] United Kingdom ............... 8502907
Mar. 13, 1985 [GB] United Kingdom ............... 8506532

[51] Int. Cl.$^4$ .................................................. G01F 1/20
[52] U.S. Cl. ................................................. 73/861.72
[58] Field of Search ....................... 73/861.72, 861.74

[56] References Cited

U.S. PATENT DOCUMENTS

| | | | |
|---|---|---|---|
| 2,804,771 | 9/1957 | Brown | 73/861.72 |
| 3,049,919 | 8/1962 | Roth | 73/861.72 |
| 3,164,019 | 1/1965 | Burgwald | 73/861.74 |
| 3,203,241 | 8/1965 | Genthe | 73/861.72 |
| 3,538,769 | 11/1970 | Shiba | 73/861.72 |
| 4,559,833 | 12/1985 | Sipin | 73/861.38 |
| 4,569,232 | 2/1986 | Kim | 73/861.72 |

*Primary Examiner*—Herbert Goldstein
*Attorney, Agent, or Firm*—McGlew and Tuttle

[57] ABSTRACT

A mass flow meter in which the mass flows along a path having a bend in one sense on one side of a pivot axis and a bend in an opposite sense on the other side of the pivot axis. When the material flows through the device a force is applied to part of the apparatus tending to rotate it. A force measuring device measures the force without the operative parts of the force measuring device moving by a significant extent.

12 Claims, 14 Drawing Figures

MASS FLOW METER

This invention relates to a mass flow meter.

Whilst the mass of a material may be measured, in many circumstances, using a weighscale or balance, such a technique cannot readily be utilised in a situation where the material to be weighed is flowing through a pipe.

It is common practice to determine the mass of a material flowing through a pipe by first measuring the volume flow per unit time, and multiplying the measured value with a value representative of the density of the material. However, this technique is very sensitive to variables such as pressure, viscosity, turbulence and temperature and thus cumulative errors may arise.

Various mass flow meters have been produced previously which seek to measure the mass of a liquid or gaseous material flowing in a pipe directly.

One prior proposed mass flow meter imparts an angular velocity to a previously linearly flowing fluid, and then measures the resultant angular momentum to provide a signal that is representative of the mass flow rate. Typically such an apparatus incorporates an impeller comprising a suitable rotor or turbine. These mass flow meters have the significant disadvantages of being prone to wear and damage and of being applicable only to the measurement of flow rates in homogenous fluids having a relatively low viscosity.

Various other proposals have been made, but at the present time there is still a need for a mass flow meter having an accuracy of at least 0.1% and capable of measuring bulk quantities, over a wide range of viscosities, of homogeneous or non-homogeneous materials.

U.S. Pat. No. 3,164,019 discloses a mass flow measuring device which comprises a substantially "S" shaped insert flexibly coupled into a pipe wherein a fluid, the mass flow of which is to be measured, is caused to flow. The flow through the "S" shaped insert generates a torque about an axis passing through the point of symmetry of the "S". This is measured with a spring which resists any movement of the insert. The spring is connected to a torque motor which is responsive to signals from a synchro connected to a pivot which pivotally supports the insert. Thus there is a closed loop servo which resists the torque generated in the "S" shaped insert, maintaining the insert at a null position, whilst measuring the torque. Since the inlet and the outlet to the "S" shaped insert are offset, if the insert expands or contracts, for example as a result of thermal expansion or contraction, an error can arise.

According to this invention there is provided a mass flow meter, said mass flow meter comprising a flow passage through which the material, the mass flow of which is to be measured, is constrained to pass, the flow passage defining a substantially linear inlet port, and a substantially linear outlet port, a further port of the flow passage being defined by an element of the apparatus that is located for pivoting about a predetermined pivot axis, said element defining a flow path portion having a bend in one sense and a bend in the opposite sense, said bends being located symmetrically about said pivot axis so that, as material flows through the device a velocity force is applied to said element tending to rotate that element about said axis, a force measuring means being provided to measure the velocity force applied to said element, the force measuring means being of the type that can measure force without the operative parts thereof being moved by a significant extent, the inlet port and the outlet port being substantially coaxially aligned.

In the prior arrangement the closed loop servo is expensive to provide, and costly to maintain. Thus in the invention preferably the force measuring means comprise a transducer, such as a gyroscopic transducer, or an oscillating wire transducer.

Preferably the arrangement is symmetrical about the said axis of rotation.

Advantageously said element comprises a substantially spherical housing, the flow being adapted to follow said flow path within the confines of the spherical housing.

In one embodiment the spherical housing comprises an inlet associated with a conduit portion directing the flow into the spherical housing in one direction, and an axially aligned outlet associated with a conduit portion directing the outflow from the housing in another direction which is not aligned with said one direction so that the material flowing through the housing follows said flow paths, the axis of rotation of the housing being perpendicular to overall direction of flow of material through the mass flow meter.

Preferably the housing has an open hollow center, said conduit portions being located at diametrically opposed positions.

In another embodiment, the housing defines two chambers, one connecting with the inlet port and one connecting with the outlet port, therebeing at least two flow passages interconnecting the chamber connected to the inlet port with the chamber connecting to the outlet port, the passages being located on opposite sides of the axis defined by the inlet port and the outlet port, the passages being curved in opposite directions when viewed from the same direction so that as material flows from the chamber connecting the inlet conduit to the chamber connecting to the outlet conduit a moment is applied to the housing tending to rotate the housing, the housing being mounted so that it can rotate at least to a limited extent about the axis defined by the inlet and outlet ports.

Preferably the housing is formed of two identical halves which are bolted or otherwise secured together.

In the prior art arrangement the density of the steam being metered is measured at a point remote from the "S" shaped insert. Where density and flow rate both fluctuate errors may arise since it is not possible to determine the density of the particular sample that applied any specific measured velocity force.

Advantageously means are provided to measure the density of the contents of said element simultaneously with the measurement of said velocity force applied to the element. Since the volume of the element is known, and the tare mass of the element is known, the total mass of the elements and contents may be determined, from which the density may be directly calculated.

In a further embodiment the element comprises a length of conduit of substantially "S" configuration, which is mounted within a housing, the housing being partitioned to form two chambers, one connected with the inlet and the other connected with the outlet, the section of conduit serving to interconnect the said chambers.

Conveniently said chambers are partitioned by a relatively flexible membrane which assists in supporting the length of conduit in position.

In order that the invention may be more readily understood, and so that further features thereof may be appreciated, the invention will now be described by way of example with reference to the accompanying drawings in which.

The described embodiments of mass flow meters utilize transducers to measure the force applied thereto. It is preferred that each transducer is a transducer of the type that operates without any significant movement of the operative parts thereof. Thus the transducer may be considered to be a "hard" transducer having an operative stroke that can be measured in microns (e.g. 10 microns) as compared with a conventional "soft" transducer which may have an operating stroke that can be measured in millimeters. For example, the transducer may comprise an oscillating wire transducer (in which the force applied to the transducer adjusts the tension present in a wire which is caused to vibrate, the vibrating or resonant or frequency of the wire being measured to determine the force applied to the transducer) or a gyroscopic transducer (in which the force applied to the transducer is caused to move one of the bearings supporting a gyroscope, the subsequent precessing of the gyroscope being indicative of the force applied).

Figure 1:
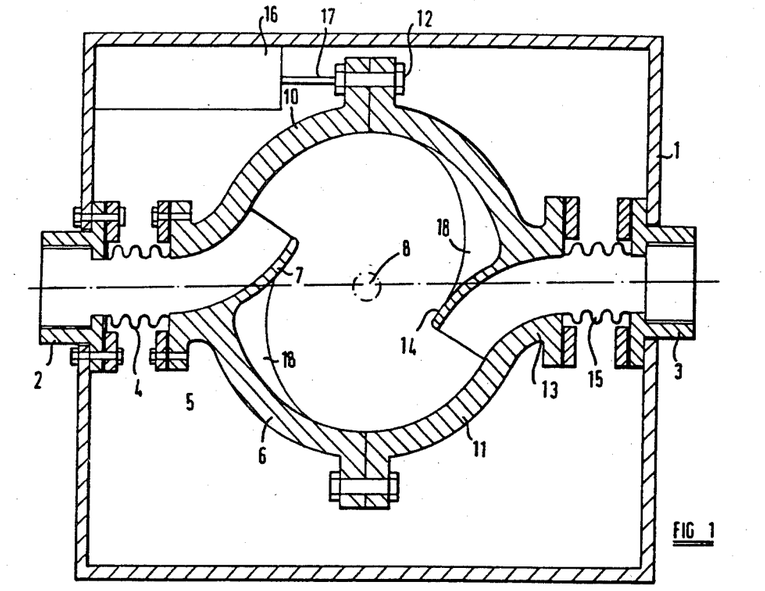
FIG. 1 is a vertical sectional view through one embodiment of the invention.
Figure 2:
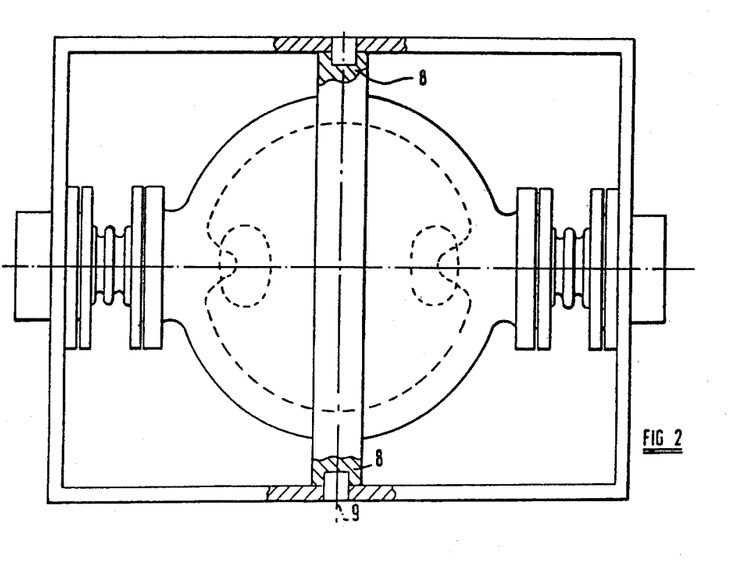
FIG. 2 is a top plan view with parts cut away of the embodiment shown in FIG. 1.

Referring now to FIGS. 1 and 2 of the accompanying drawings in a first embodiment of the invention an outer housing 1 is provided, but the housing only serves the function of maintaining the inlet conduit 2 and the outlet conduit 3 in precisely determined positions. The inlet conduit and the outlet conduit are aligned, and are thus co-axial. The inlet conduit 2 is connected by means of a flexible pipe portion 4 to an inlet port 5 provided on a symmetrical spherical inner housing 6. The inlet port 5 of the inner housing 6 is connected to an interior stub conduit 7 which directs the flow of material entering the inner housing 6 upwardly tangentially adjacent the interior surface of the spherical inner housing 6.

The spherical inner housing 6 is mounted on horizontal trunions 8 for pivoting about a horizontal pivot axis 9. The housing is actually fabricated from two identical halves 10, that are bolted together by means of bolts 12. Thus the spherical inner housing 6 defines an outlet port 13 which is axially aligned with the inlet port 5. The outlet port is associated with a stub conduit 14 located on the interior of the spherical inner housing 6, this stub conduit extending downwardly substantially tangentially with the interior of the lower part of the spherical inner housing 6. The stub conduits 7 and 14 are diametrically opposed.

The outlet port 13 of the spherical inner housing 6 is connected by a flexible pipe portion 15 to the outlet conduit 3 of the entire flow meter.

A force measuring transducer 16 is provided, of the type described above and a connecting rod 17 extends between part of the inner housing 6 and the transducer 16 so that any force tending to rotate the inner housing 6 about the axis defined by the trunnions may be detected by the transducer 16.

It is to be noted that flow dividing webs 18 may be provided on the interior of the housing associated with the stub conduits 7, 14. In FIG. 2, the open mouths of the stub conduits 7, 14 are shown in phantom and the webs 18 are also illustrated in a similar manner.

It is to be appreciated that the described embodiment of the invention is substantially symmetrical. This will reduce any measurement errors that might be caused by temperature variations, vibrations or the like.

In practive, as the housing 6 may be hot or cold, the transducer is thermally insulated from the housing, for example by providing a thermal break in the connecting rod. Temperature compensation may be achieved by providing a connecting rod having a selected coefficient of expansion such that as the configuration of the housing is changed, due to expansion or contraction upon a change in ambient temperature, a precisely compensating change occurs in the configuration of the connecting rod. The connecting rod may conveniently be formed from metals having different coefficients of expansion.

When a flow of material is introduced to the described apparatus through the inlet conduit 2 the material flows through the flexible pipe portion 4, through the inlet port 5 of the inner spherical housing 6 and is then constrained to flow upwardly through the short stub pipe 7. The flow of material then must turn downwardly, and this downturning of the flow occurs at a point spaced above the rotational axis 9 defined by the trunnions 8. When the material has flowed downwardly it subsequently again turns to flow upwardly through the stub conduit 14 to the outlet port 13. This upward turning is effected at a position below the pivoting axis 9 defined by the trunnions 8. The flow then leaves the described apparatus through the outlet ports 13 and the outlet conduit 3. Since the flow is constrained to change its direction of flow twice in opposite senses or directions on opposite sides of the pivot axis 9, a resultant rotational force is applied to the inner housing 6. This force is dependent on the velocity of flow, and thus termed a velocity force. However, the force is also dependant on the mass flow rate. This velocity force is measured by the transducer 16. Since the transducer is of the "hard" type as described above, the inner housing 6 does not actually rotate to any significant extent, but nevertheless the velocity force tending to rotate the inner housing can be measured accurately.

It is to be noted that the material flowing through the described device is first constrained to change direction in one sense and is then constrained to change direction in the other sense, the points at which the change of direction of flow is effected being located in a symmetrical way on opposite sides of an axis of rotation, the resultant velocity force tending to rotate the housing about that axis subsequently being measured. The velocity force that tends to rotate the housing is generated since when any material flowing through the housing turns a corner, a force is applied to the housing which is dependent upon the density i.e. the mass of the material flowing through the conduit, and the square of the velocity. Since the material changes direction first in one sense and then in the opposite sense, and since the changes of direction are located on opposite sides of the axis 9 defined by the trunnions 8, the resultant force causes a moment about the horizontal axis 9, and this force tends to cause the housing to rotate about the horizontal axis 9. However, since the connectio rod 17, extends between the housing and the transducer 16, this rotation of the housing is resisted, and thus the housing remains subtantially stationary. However, the velocity force tending to rotate the housing can be measured by the transducer 16, this force being indicative of the density or mass of material flowing through the conduit.

Figure 3:
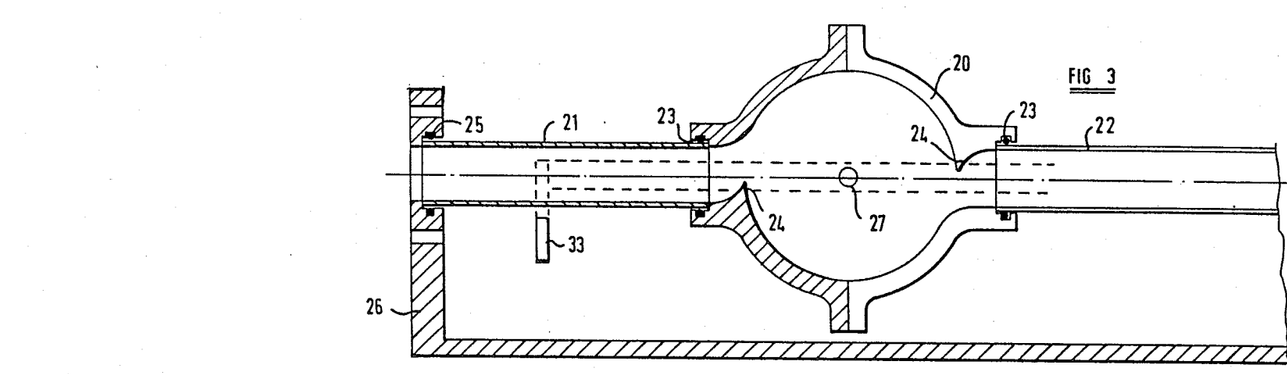
FIG. 3 is a vertical part sectional view corresponding to FIG. 1 but showing a modified embodiment of the invention.
Figure 4:
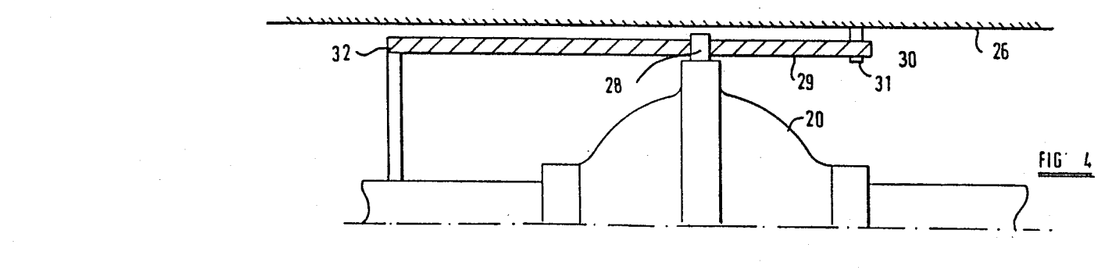
FIG. 4 is a top plan view of part of the apparatus shown in FIG. 3.
Figure 5:
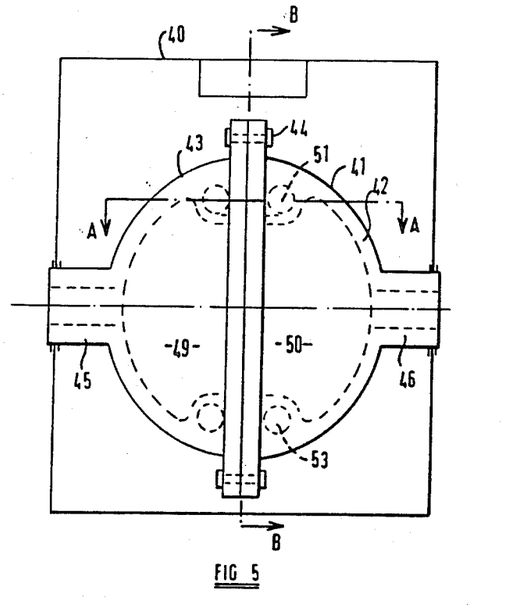
FIG. 5 is a side elevational view of another embodiment of the invention.
Figure 6:
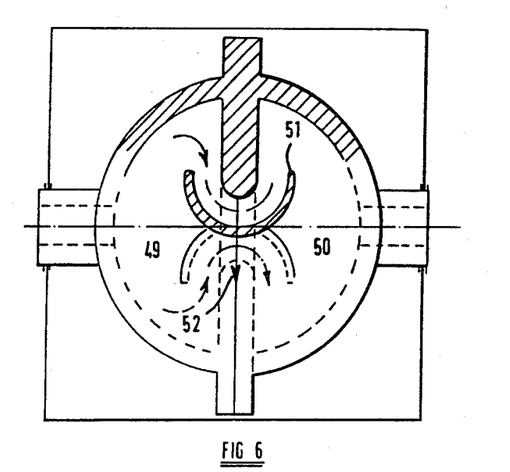
FIG. 6 is a view taken on the line A—A of FIG. 5.
Figure 7:
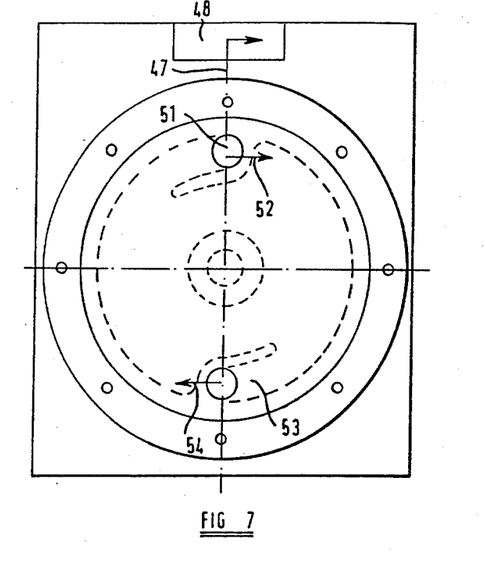
FIG. 7 is a view taken on the line B—B of FIG. 5.
Figure 8:
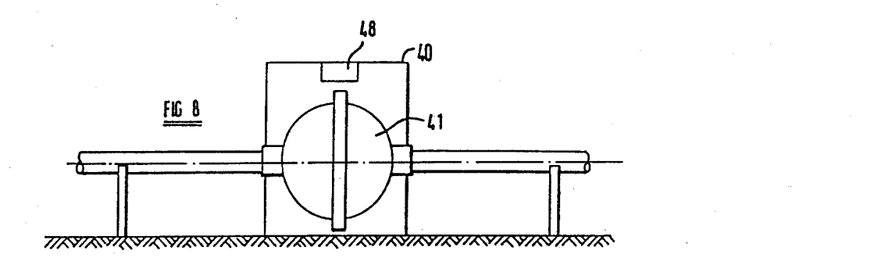
FIG. 8 is a diagrammatic view showing the embodiment of the invention of FIGS. 5 to 7 in use.
Figure 9:
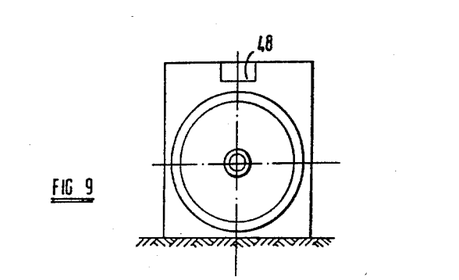
FIG. 9 is an end elevational view of the arrangement shown in FIG. 8.

FIGS. 3 and 4 illustrate an alternative embodiment of the invention which operates on the same principle as the embodiment illustrated in FIG. 2. It will be observed that this embodiment of the invention incorporates a spherical housing 20 which corresponds to the spherical housing 6 of the first described embodiment of the invention. Instead of being mounted by means of flexible pipe portions, the housing 20 is mounted in position by means of an inlet pipe 21 and an outlet pipe 22, the inlet and outlet pipes being mounted, by means of appropriate "O" rings 23, 23 in inlet and outlet apertures formed in the spherical housing 20. The inlets are associated with short stub pipes 24, 24, corresponding to the stub pipes of the first described embodiment. The pipes 21, 22 are mounted by means of further "O" rings (only one of which, 25, is shown) in a housing 26. The arrangement is such that the spherical housing 20 is pivotally mounted for rotation about an axis 27 and can rotate slightly about that axis due to the freedom of movement provided to the spherical housing 20 by virtue of the way it is mounted in position by means of the pipes 21, 22 and the associated "O" rings.

As can be seen more clearly from FIG. 4, one of the trunnions 28 by means of which the spherical chamber 20 is mounted for rotation about the axis 27 is actually inserted through an aperture formed in a lever 29. One end, 30, of the lever 29 is pivotally connected by means of a pivot pin 31, to one wall of the housing 26. The other end 32 of the lever is adapted to provide a force to a density force sensing transducer 33. It will be seen that the mass of the spherical housing 20 will tend to cause the trunnion 28 to move downwardly, thus causing lever 29 to pivot in a downward manner about the pivotal connectio 31, thus forcing the end 32 of the lever downwardly on to the force sensing transducer 33. The density force sensing transducer can thus provide an output signal representative of the mass of (or density of the contents of) the spherical housing 20. Of course, the effective mass of the spherical housing 20 will depend upon the weight of material present within the housing at any point in time, and since the volume of the housing is known the output from the transducer 33 may be calibrated in mass or in density. Consequently it will be appreciated that the embodiment described in FIGS. 3 and 4 can provide an indication of the mass of, and density of, material flowing through the chamber 20. Of course, a velocity transducer corresponding to the transducer 16 will be provided to measure the rotational force applied to the spherical chamber 20 by means of the material flowing therethrough, and thus the apparatus shown in FIGS. 3 and 4 can provide detailed information concerning the density, and the mass flow rate, of material flowing through the spherical chamber 20.

It is to be understood that the embodiment of FIGS. 3 and 4 measures the density of a sample being measured and the turning force generated by that sample simultaneously. This provides a more accurate result than obtainable with prior proposed devices in which the density of a flowing stream is measured at one point, and a turning moment generated by the velocity force of the stream is measured at another point.

It is to be noted that the material flowing through the described device is first constrained to change direction in one sense and is then constrained to change direction in the other sense, the points at which the change of direction of flow is effected being located in a symmetrical way on opposite sides of an axis of rotation, the resultant force tending to rotate the housing about that axis subsequently being measured.

FIGS. 5 to 9 illustrate another embodiment of the invention.

An outer housing 40, of square form, contains an inner housing 41, the exterior of which is of generally spherical configuration. The outer housing 41 is formed of two identical halves 42, 43 which are bolted together by bolts 44 passing through coaligned apertures in protruding flanges formed on the housing halve 42, 43.

The housing half 42 defines an inlet port 45 which passes through one exterior wall of the housing 40, and the housing half 41 defines an outlet port 4, axially aligned to the inlet port 45, which passes through the other side of the housing.

The inner housing 41 is mounted for rotation about the axis defined by the inlet port 45 and the outlet port 46. Part of the periphery of the housing is connected by means of an appropriate connecting rod 47 to a transducer 48 of the "hard" type as described above.

The two housing parts 42, 43 define respective chambers 49, 50 which are substantially sealed from each other. However, two flow passages are provided which interconnect the chambers 49, 50. As can be seen most clearly in FIG. 6 one communication passage is located adjacent the top of the inner housing 41 and is located adjacent the shell of the housing. A channel 51 that forms the flow passage is configured to be of a substantially "U" configuration, the two arms of the "U" being parallel with and on either side of the central partition which separates the chambers 49 and 50. It will be appreciated that a flow of material passing through the "U" shaped channel will impart a force F' to the housing as indicated by the arrow 52. Another identical channel 53 is located on the opposite side of the pivot axis defined by the inlet port 45 and the outlet port 46 and comprises a similar configured "U" channel, but having (when viewed in plan), the opposite sense. Thus the force F', indicated by the arrow 54 exerted on the housing when material flows through the flow meter cooperates with the force indicated by the arrow 52 to create a moment, proportional to the velocity force, tending to rotate the inner housing 41 about the pivot axis defined by the inlet port 45 and the outlet port 46.

The force actually applied to the inner housing is measured by the transducer 48 which is of the "hard" typd, as described above. Thus, whilst the force applied to the housing is measured, the housing does not actually rotate to any significant extent.

Figure 10:
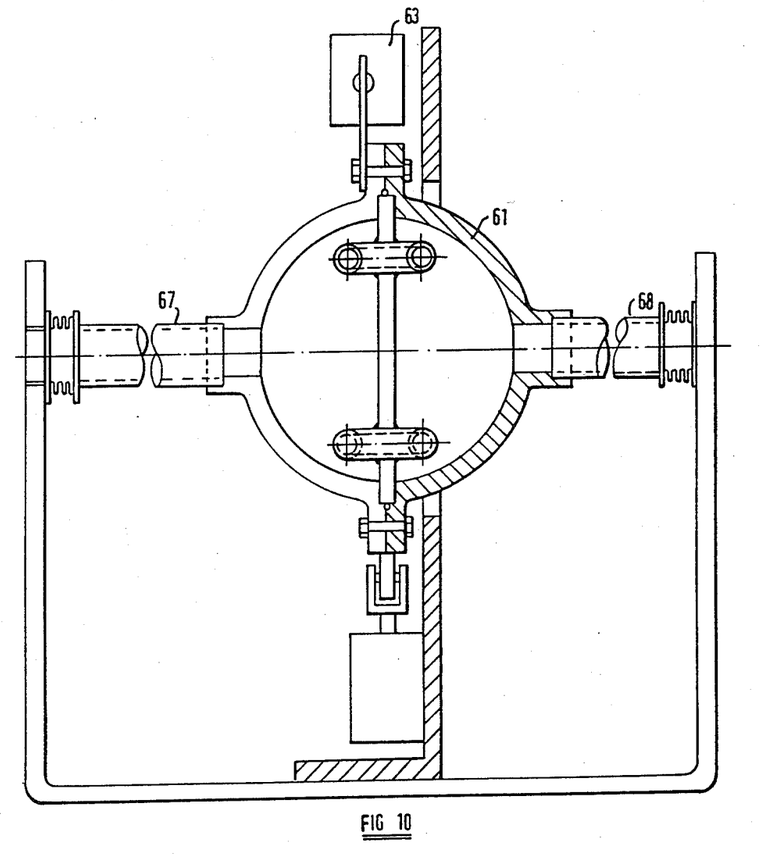
FIG. 10 is a part sectional view corresponding to FIG. 5 showing a modified embodiment of the invention.
Figure 11:
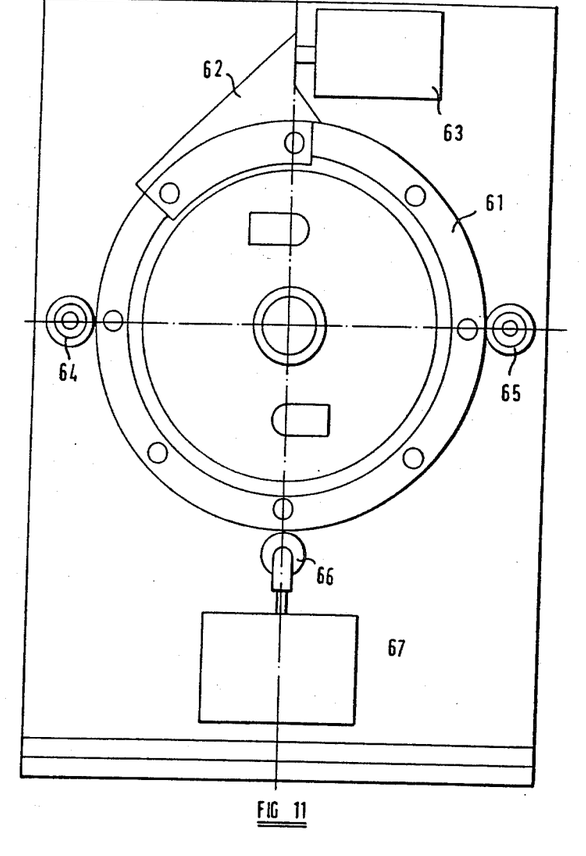
FIG. 11 is a view corresponding to FIG. 7 showing the modified embodiment of FIG. 10.

Referring now to FIGS. 10 and 11, a further embodiment of the invention is shown which corresponds broadly to the embodiment of FIGS. 5 to 9, although it will be noted that the spherical chamber 61 of the embodiment shown in FIGS. 10 and 11 is of a slightly different design to the spherical chamber 41 of the embodiment of FIGS. 5 to 9. Howver, the differences are not sufficient to warrant detailed description at this stage. It will be noted that, in the embodiment illustrated in FIGS. 10 to 11 the housing 61 carries a protruding arm 62 adapted to engage a force sensing transducer 63 which corresponds to the transducer 48 of the embodiment of FIGS. 5 to 9. It will be noted that the spherical housing 61 is mounted in position by means of three rollers 64, 65, 66 to permit the housing 61 to rotate about the axis defined by the inlet pipe 67 and the outlet pipe 68 which are connected appropriately to the housing 61.

It will be observed that the lowermost roller 66 is mounted on a force measuring transducer 67 which is of the "hard" type described above. The transducer 67 is thus adapted to provide an output signal representative of the mass of the chamber 61 and the contents thereof. It will be appreciated, therefore, that the embodiments shown in FIGS. 10 and 11 may be used not only to measure the mass flow rate of material passing through the chamber 61, but may also be used to measure the instantaneous mass present within the chamber 61, thus enabling the density of the material to be calculated. The embodiment of FIGS. 3 and 4 may also be used in this way.

It will be observed that in all the previously described embodiments of the invention, the inlet and outlet conduits are axially co-aligned, and this serves to minimise any errors that may be introduced to the apparatus if, for example, the pressure (and thus in some cases the density) of material entering on one side of the mass flow meter is less than the pressure of the material leaving the other side of the mass flow meter. Also, the coalignment of the inlet and outlet ports reduces the risk of any errors arising due to temperature differentials present in the apparatus. If the inlet and outlet were not aligned, but were offset, if the temperature of the apparatus varies, due to thermal expansion and contraction, an error would be introduced. However, with the inlet and outlet coaligned thermal expansion and contraction of the components of the mass flow meter does not cause the inlet and the outlet to be misaligned.

Figure 12:
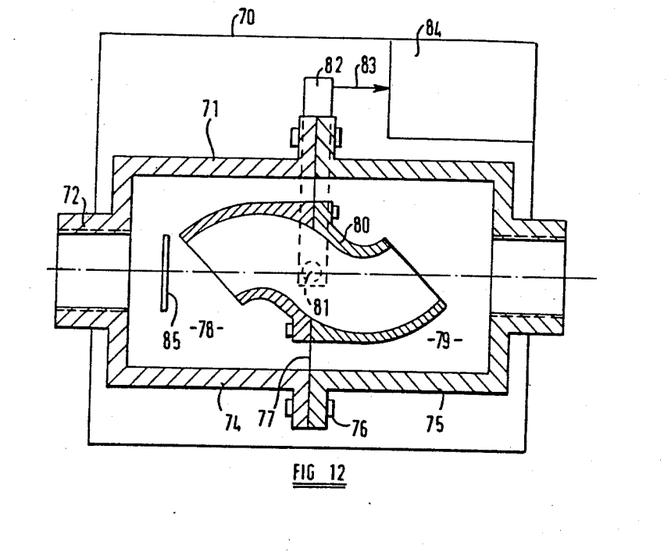
FIG. 12 is a vertical sectional view through yet another embodiment of the invention.
Figure 13:
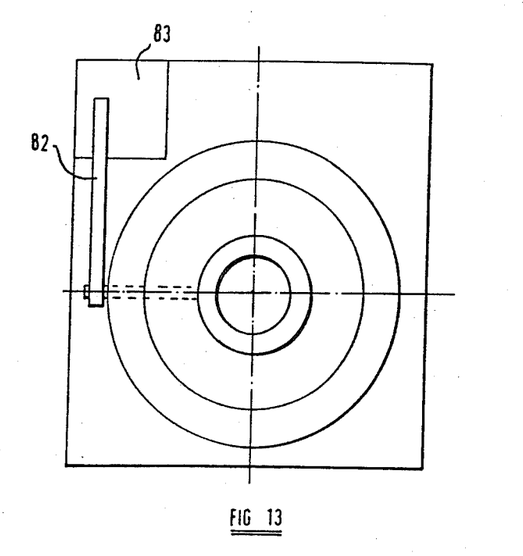
FIG. 13 is an end elevational view of the embodiment shown in FIG. 12.
Figure 14:
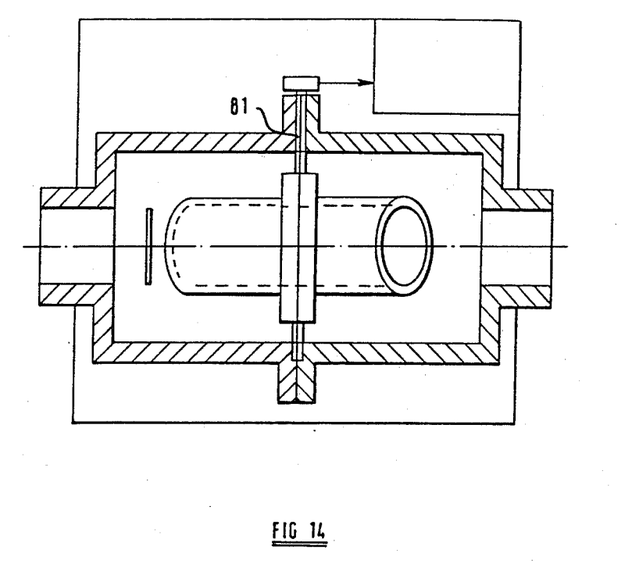
FIG. 14 is a top plan view, with parts cut away, of the embodiment of FIGS. 12 and 13.

Referring now to FIGS. 12 to 14 a further embodiment of the invention is disclosed. In this embodiment of the invention an outer housing 70 is provided, but this outer housing is optional. The outer housing contains an inner housing 71 of generally rectangular configuration which defines an axial inlet port 72 and, at the opposite end thereof an axial outlet port 73. The inlet and outlet ports are co-aligned, as in the earlier described embodiments of the invention. The housing is actually formed of two identical elements 74, 75 which are connected together by means of bolts 76 passing through appropriate flanges provided on the elements 74, 75. A slightly resilient diaphragm 77 is provided which is trapped between the housing halves and which serves to divide the interior of the housing into two separate chambers, namely a first chamber 78 communicating with the inlet port 72 and a second chamber 79 communicating with the outlet port 73. A substantially "S" sectioned length of conduit 80 is sealingly mounted on the diaphragm 77 and is also mounted for rotation about an axle 81 which can be seen most clearly in FIG. 14. One end of the axle 81 is connected to a lever 82, the end of which is connected by means of a connecting rod 83 to a transducer 84 of the "hard" type as described above. A baffle 85 may be provided within the chamber 78 coaligned with the inlet port 72, if desired.

A material, the mass flow of which is to be measured, may be introduced to the described apparatus through the inlet port 72. The material will then flow through the "S" shaped channel defined by the "S" configured section of conduit 80 which is symmetrical relative to the axis 81 of rotation thereof. The material flowing through the conduit 80 is thus constrained to change direction in one sense on one side of the pivot axle 81 and to change direction in the opposite sense on the other side of the pivot axle 81. Thus the section of conduit 80 has a moment of force applied thereto, proportional to the velocity force, tending to rotate the section of conduit 80 about the axle 81. This rotational force is measured by means of the transducer 84. Since the transducer 84 is a "hard" transducer the conduit 80 does not actually rotate to any significant extent, but nevertheless the force tending to rotate the conduit is still measured. This force is representative of the mass flow.

In all the above described embodiments the force measuring transducer or transducers may be connected to an appropriately programmed microprocessor or computer which will provide an output indication of the value of the specific parameter being measured.

I claim:

1. A mass flow meter comprising a flow passage through which the material, the mass flow of which is to be measured, is constrained to pass, the flow passage defining an inlet port, and an outlet port, a further part of the flow passage being defined by a substantially spherical housing that is located for pivoting about a predetermined pivot axis, said spherical housing defining a flow path portion having a bend in one sense and a bend in the opposite sense, said bends being located symmetrically about said pivot axis, the flow of material being adapted to follow said flow path portion within the confines of said spherical housing, whereby as material flows through the device a velocity force is applied to said spherical housing tending to rotate said housing about said axis, and force measuring means operatively connected to said spherical housing for measuring the velocity force applied to said housing, said force measuring means being of the type that can measure force with the operative parts thereof being substantially fixed, said inlet port and said outlet port being substantially coaxially aligned.

2. A mass flow meter according to claim 1 wherein the force measuring means comprise a transducer.

3. A mass flow meter according to claim 2 wherein the transducer is a gyroscopic transducer.

4. A mass flow meter according to claim 2 wherein the transducer is an oscillating wire transducer.

5. A mass flow meter according to claim 1 wherein the housing is formed of two identical halves which are secured together.

6. A mass flow meter according to claim 1, wherein the spherical housing comprises an inlet connected to said inlet port and associated with a conduit portion directing the flow into the spherical housing in one direction, and an axially aligned outlet connected to said outlet port and associated with a conduit portion direction the outflow from the housing in another direction which is not aligned with said one direction so that the material flowing through the housing follows said flow path portion, the axis of rotation of the housing being perpendicular to overall direction of flow of material through the mass flow meter.

7. A mass flow meter according to claim 6 wherein the housing has an open hollow center, said conduit portions being located at diametrically opposed positions.

8. A mass flow meter according claim 1 including a housing defining two chambers, one connecting with the inlet port and one connecting with the outlet port, there being at least two flow passages interconnecting the chamber connected to the inlet port with the chamber connecting to the outlet port, the passages being located on opposite sides of the axis defined by the inlet port and the outlet port, the passages being curved in opposite senses when viewed from a side perpendicular to the flow plane so that as material flows from the chamber connecting to the inlet conduit to the chamber connecting to the outlet conduit a moment is applied to the housing tending to rotate the housing, the housing being mounted so that it can rotate at least to a limited extend about the axis defined by the inlet and outlet ports.

9. A mass flow meter according to claim 8 wherein the housing is formed of two identical halves which are secured together.

10. A mass flow meter according to claim 1, wherein said spherical housing comprises an inlet conduit resiliently connected to said housing at said inlet port for permitting some pivoting of said housing, an outlet conduit resiliently connected to said housing outlet port for permitting some pivoting of said housing, said inlet and outlet conduits being axially aligned along a conduit axis which is perpendicular to said pivot axis, said spherical housing including a first internal stub adjacent said inlet port for deflecting fluid in one direction in said housing and a second stub ajdacent said outlet port for deflecting fluid in an opposite direction in said housing, said one and opposite directions being on opposite sides of said pivot axis and on opposite sides of said conduit axis so that with a mass flow through said housing, forces are exerted on said housing to tend said housing to rotate about said pivot axis which forces are sensed by said force measuring means.

11. A mass flow meter comprising a flow passage through which the material, the mass flow of which is to be measured, is constrained to pass, the flow passage defining an inlet port, and an outlet port, a further part of the flow passage being defined by a length of conduit of substantially S shaped configuration which is mounted for pivoting about a predetermined pivot axis within a housing, said housing being partitioned to form two chambers, one connected with said inlet port and the other connected with said outlet port, said chambers being interconnected by said length of conduit, said conduit defining a flow path portion having a bend in one sense and a bend in the opposite sense, said bends being located symmetrically about said pivot axis whereby as material flows through the device a velocity force is applied to said conduit tending to rotate said conduit about said axis, and force measuring means operatively connected to said length of conduit for measuring the velocity force applied to said conduit, said force measuring means being of the type that can measure force with the operative parts thereof being substantially fixed, said inlet port and said outlet port being substantially coaxially aligned.

12. A mass flow according to claim 11 wherein said chambers are partitioned by a relatively flexible membrane which assists in supporting the said length of conduit in position.

* * * * *